(12) United States Patent
Al-Mufti et al.

(10) Patent No.: US 9,176,216 B2
(45) Date of Patent: Nov. 3, 2015

(54) ENHANCED CELL ID LOCATION METHOD USING NON UNIFORM SUBSECTORS AND NEIGHBORING CELL CENTROID

(71) Applicant: MAPLE ACOUISITION, LLC, Annapolis, MD (US)

(72) Inventors: Khalid Al-Mufti, Sterling, VA (US); Ariful Hannan, Sterling, VA (US); Suryanarayana Kalenahalli, Chantilly, VA (US); Navin Srinivasan, Fairfax, VA (US)

(73) Assignee: MAPLE ACQUISITION LLC, Annapolis, MD (US)

( * ) Notice: Subject to any disclaimer, the term of this patent is extended or adjusted under 35 U.S.C. 154(b) by 132 days.

(21) Appl. No.: 13/834,057

(22) Filed: Mar. 15, 2013

(65) Prior Publication Data

US 2014/0171105 A1 Jun. 19, 2014

Related U.S. Application Data

(60) Provisional application No. 61/737,480, filed on Dec. 14, 2012.

(51) Int. Cl.
| | |
|---|---|
| *H04W 24/00* | (2009.01) |
| *G01S 5/02* | (2010.01) |
| *G01S 5/12* | (2006.01) |
| *H04W 64/00* | (2009.01) |

(52) U.S. Cl.
CPC ............... *G01S 5/0221* (2013.01); *G01S 5/12* (2013.01); *H04W 64/00* (2013.01)

(58) Field of Classification Search
CPC ..................... H04W 4/00; H04W 4/02–4/046; H04W 64/00–64/006

USPC .......... 455/404.1, 0.2, 414.1, 456.1, 0.3, 0.4, 455/0.5, 0.6, 457; 701/207, 213, 214, 216, 701/400, 408, 410, 411, 445, 454, 469; 340/988; 342/367.1, 0.06, 0.12, 450, 342/457, 357.2, 357.23
See application file for complete search history.

(56) References Cited

U.S. PATENT DOCUMENTS

| | | | | |
|---|---|---|---|---|
| 5,508,707 | A * | 4/1996 | LeBlanc et al. | 342/457 |
| 5,945,948 | A * | 8/1999 | Buford et al. | 342/457 |
| 6,269,247 | B1 * | 7/2001 | Chiodini | 455/456.2 |
| 6,947,734 | B1 * | 9/2005 | Toubassi | 455/423 |
| 6,950,664 | B2 * | 9/2005 | Chen et al. | 455/456.5 |
| 7,783,303 | B1 * | 8/2010 | Lerner et al. | 455/456.1 |
| 8,050,686 | B1 * | 11/2011 | Souissi et al. | 455/456.1 |
| 8,055,270 | B1 * | 11/2011 | Copeland et al. | 455/456.1 |

(Continued)

*Primary Examiner* — Steve D Agosta
(74) *Attorney, Agent, or Firm* — Tarolli, Sundheim, Covell & Tummino LLP (57) ABSTRACT

A system and method of determining the location of a mobile device. Network measurement report information may be received from a target mobile device, the NMR having measurement information and range information of the target mobile device from a cell serving the device. The serving cell may be divided a plurality of subsectors and candidate locations placed on an intersection of a range formed from the range information and bisectors of the plurality of subsectors. A subset of neighboring and serving cells may be selected as a function of the NMR measurement information and a radio frequency (RF) coverage centroid determined for each of the selected neighboring cells. A centroid of the determined RF centroids may be determined, and a location of the target mobile device estimated as the candidate location having a minimum distance to the determined centroid.

11 Claims, 7 Drawing Sheets

(56) References Cited

U.S. PATENT DOCUMENTS

| | | |
|---|---|---|
| 8,195,190 B1* | 6/2012 | Hou .......................... 455/456.1 |
| 2003/0125046 A1* | 7/2003 | Riley et al. .................... 455/456 |
| 2003/0146871 A1* | 8/2003 | Karr et al. ..................... 342/457 |
| 2005/0136845 A1* | 6/2005 | Masuoka et al. ........... 455/67.14 |
| 2010/0130230 A1* | 5/2010 | Aggarwal et al. .......... 455/456.1 |
| 2010/0222075 A1* | 9/2010 | Miura ........................ 455/456.1 |
| 2011/0028162 A1* | 2/2011 | Hazzani ..................... 455/456.1 |
| 2011/0159876 A1* | 6/2011 | Segall et al. .................. 455/442 |
| 2012/0052835 A1* | 3/2012 | Bull et al. ................... 455/404.2 |

* cited by examiner

ENHANCED CELL ID LOCATION METHOD USING NON UNIFORM SUBSECTORS AND NEIGHBORING CELL CENTROID

CROSS REFERENCE

The present application is a non-provisional application of and claims the priority benefit of co-pending U.S. Provisional Application No. 61/737,480 entitled "Enhanced Cell-ID Location Method Using Non Uniform Subsectors and Neighboring Cell Centroid," filed on Dec. 14, 2012, which is hereby incorporated by reference in its entirety.

BACKGROUND

The location of a mobile, wireless or wired device is a useful and sometimes necessary part of many services. The precise methods used to determine location are generally dependent on the type of access network and the information that can be obtained from the device. For example, in wireless networks, a range of technologies may be applied for location determination, the most basic of which uses the location of the radio transmitter as an approximation.

Exemplary wireless networks may be a World Interoperability for Microwave Access (WiMAX) network, a Long Term Evolution (LTE) network, and the like. Generally, WiMAX is intended to reduce the barriers to widespread broadband access deployment with standards-compliant wireless solutions engineered to deliver ubiquitous fixed and mobile services such as VoIP, messaging, video, streaming media, and other IP traffic. LTE is generally a 4G wireless technology and is considered the next in line in the Global System for Mobile Communication (GSM) evolution path after Universal Mobile Telecommunications System (UMTS)/High-Speed Downlink Packet Access (HSPDA) 3G technologies. LTE builds on the 3GPP family including GSM, General Packet Radio Service (GPRS), Enhanced Data Rate for Global Evolution (EDGE), Wideband Code Division Multiple Access (WCDMA), High Speed Packet Access (HSPA), etc., and is an all-IP standard like WiMAX. LTE is based on orthogonal frequency division multiplexing (OFDM) Radio Access technology and multiple input multiple output (MIMO) antenna technology. LTE provides higher data transmission rates while efficiently utilizing the spectrum thereby supporting a multitude of subscribers than is possible with pre-4G spectral frequencies. LTE is all-IP permitting applications such as real time voice, video, gaming, social networking and location-based services. LTE networks may also co-operate with circuit-switched legacy networks and result in a seamless network environment and signals may be exchanged between traditional networks, the new 4G network and the Internet seamlessly. While LTE protocol is being defined in the 3GPP standards as the next generation mobile broadband technology, there is a need for mobile subscriber or user equipment (UE) location in LTE networks for compliance with the FCC E-911 requirements and for other location based services. The 3GPP standards have also identified different methods that could be used for positioning of an UE for an evolved-UMTS Terrestrial Radio Access Network (E-UTRAN).

A number of applications currently exist within conventional communication systems, such as those supporting GSM, Time Division Multiple Access (TDMA), Code Division Multiple Access (CDMA), Orthogonal Frequency Division Multiple Access (OFDMA) and UMTS technologies, for which location solutions are needed by mobile units, mobile stations, UE or other devices and by other entities in a wireless network. Examples of such applications may include, but are not limited to, GSM positioning and assisted global positioning system (A-GPS) positioning A-GPS adaptable UE may acquire and measure signals from a number of satellites to obtain an accurate estimate of the UE's current geographic position. GPS-based solutions may offer excellent accuracy, but GPS-based solutions generally suffer from yield issues in indoor environments or in environments that provide a poor line of sight to the open sky in which to best receive GPS satellite transmissions. Furthermore, embedding GPS chipsets into UE may also add an associated cost to the manufacturing of the UE and an associated cost to A-GPS functionality in the respective communications network. Further, some organizations are hesitant to offer a positioning method solely based upon the availability of a satellite network controlled by the United States government. There, however, exists a need in the art to locate UMTS, OFDMA or W-CDMA mobile devices to satisfy FCC E-911 regulations as well as to provide Location Based Services for mobile phone users.

The 3GPP UMTS standard outlines several methods for location including Cell-ID, Enhanced Cell-ID (E-CID), A-GPS, Observed Time Difference of Arrival (OTDOA), and Uplink Time Difference of Arrival (U-TDOA). Cell-ID generally is the simplest method which provides coarse positioning of mobile devices based on a known location of the coverage area centroid of each base station sector. Additionally, A-GPS is a straightforward implementation for network and handset manufacturers due to their legacy in CDMA2000 networks. Likewise, U-TDOA is also a straightforward technique for those skilled in the art and has been widely deployed for other air standards. OTDOA, on the other hand, is confronted with significant implementation challenges for network carriers, due to the fact that the base station timing relationships must be known, or measured, for this technique to be viable. For unsynchronized UMTS networks, where the base station timing is not locked to a common timing source, the 3GPP standard offers the suggestion that base station Location Measurement Units (LMUs) or Network Synchronization Units (NSUs) may be utilized to recover this timing information. Once the base station timing relationships are measured, the handset measurements of Observed Time Difference (OTD) between various base stations may be translated into absolute ranges and range differences from which position can be calculated.

Thus, mobile location techniques in wireless cellular networks may be broadly classified into three categories based upon the source of signal measurements: network-based measurements, UE-based measurements, and LMU-based measurements. In the network-based measurement location technique category, popular location techniques include radio frequency (RF) finger-printing/pattern matching algorithms and received signal strength indication (RSSI)-based location algorithms. UE-based measurement location techniques include, but are not limited to, OTDOA techniques and A-GPS techniques (handset-based or handset-assisted). LMU-based measurement location techniques generally include techniques having LMUs co-located with the base stations and involve measuring a mobile device's uplink signal(s).

There is, however, a need in the art to obviate the deficiencies in the prior art and provide network-based or other measurement location techniques applicable to any handset or mobile device capable of reporting E-CID measurements in a wireless communications network.

SUMMARY

Embodiments of the present subject matter may employ network-based or other measurement location techniques and may be applicable to any handset or mobile device capable of reporting E-CID measurements in a wireless communications network. Exemplary measurements include, but are not limited to, ranges from a cell or site serving a target mobile device, ranges from neighboring cells, one or more sets of power measurements of serving and/or neighboring cells. Embodiments of the present subject matter do not require new base station hardware and offer an accurate means to estimate a location of a mobile device. Further, embodiments of the present subject matter may utilize RF configuration parameters, such as cell transmit power level, antenna pattern, down tilt, gain, etc. to employ an exemplary location algorithm and determine an optimum location of a mobile device using, for example, a distance to a single point, rather than an area to produce a location having a higher processing-time-efficiency than conventional methods such as that described in U.S. Pat. No. 6,950,644.

In some embodiments of the present subject matter, a method and system for determining the location of a mobile device is provided. For example, in a wireless communications network a location server may create a database of the locations of cell centroids in the network and any asymmetrically and/or symmetrically distributed bisectors of each cell in the network. In one embodiment, the location server may make use of an a priori available wireless network configuration table including information such as cell location, orientation and beam width openings to create such a database. Upon receiving a location request, the server may initiate two actions including transmitting a request for network measurements from the target UE or device through, for example, an E-CID Request message and performing a read operation of any previously stored cell information, such as, but not limited to, cell centroid, bisector information of the serving cell of interest. Upon receiving a target UE response, reported measurements and cached serving cell information may then be passed to an exemplary location determination algorithm. The location determination algorithm may then proceed by determining a set of candidate locations from the intersections of any one or several of the measured. UE-to-serving ranges and the asymmetrically or symmetrically distributed serving cell bisectors. The algorithm may then identify a subset of the reported neighboring cells using a selection process based on, for example, absolute received power level, such as reference signal received power (RSRP), common pilot channel received signal code power (CPICH RSCP), a ratio of a cell's measured power level relative to the maximum of all measured cell power levels, and other measurements or functions. For each of the selected neighboring cells, an exemplary algorithm may read the corresponding centroid information from the database and determine a geographic centroid of the selected neighboring cell(s)' centroids as a function of this centroid information. In one embodiment, the candidate location closest to the centroid of selected neighboring cell centroids may then be identified and returned as the target UE location estimate. In a further embodiment, an exemplary algorithm may return an associated uncertainty determined as a function of the type of the reported range measurement and/or selected subsector. The location server may then send the determined location and/or uncertainty to the requesting entity in a location response message. In embodiments where the target UE's range measurement is below a certain threshold, e.g., below 100 meters, an exemplary location algorithm may return an intersection of a heading of the serving cell and the estimated range as the location estimate. In this instance, this would be an optimum solution as the resulting average fix error can be quite low, especially for low range and six sectored site cases.

In another embodiment of the present subject matter, a method of determining the location of a mobile device is provided. The method may include receiving a network measurement report (NMR) from a target mobile device or measurements performed by target mobile device in response to an E-CID/OTDOA request from the network. These measurements may contain information for a cell serving the target mobile device and then dividing the serving cell into a plurality of subsectors. The method may also include placing candidate locations on an intersection of bisectors of the plurality of subsectors and a range determined using the NMR range information and selecting a subset of neighboring and serving cells as a function of the NMR measurement information. A radio frequency (RF) coverage centroid for each of the selected neighboring cells may then be determined and a centroid of the determined RF centroids determined. The method then includes determining a location of the target mobile device as the candidate location having a minimum distance to the determined centroid.

A further embodiment of the present subject matter includes method of determining the location of a mobile device in a communications network in communication with a serving cell. The method includes receiving measurement information from cells neighboring the serving cell and range information from the serving cell and determining a centroid for each of a plurality of neighboring and serving cells. The method also includes determining a centroid for the plurality of centroids of neighboring and serving cells and determining a plurality of candidate locations as a function of an intersection of bisecting serving cell lines and the received range information. A location of the mobile device may then be determined as the candidate location having a minimum distance to the determined centroid of the plurality of centroids.

DETAILED DESCRIPTION

With reference to the figures, where like elements have been given like numerical designations to facilitate an understanding of the present subject matter, the various embodiments for methods and systems of enhanced cell ID (E-CID) location using uniform subsectors and neighboring cell centroids are described.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that some of the desired benefits of the present subject matter can be obtained by selecting some of the features of the present subject matter without utilizing other features. Accordingly, those who work in the art will recognize that many modifications and adaptations of the present subject matter are possible and may even be desirable in certain circumstances and are part of the present subject matter. Thus, the following description is provided as illustrative of the principles of the present subject matter and not in limitation thereof. While the following exemplary discussion of embodiments of the present subject matter may be directed towards or references specific telecommunications systems, it is to be understood that the discussion is not intended to limit the scope of the present subject matter in any way and that the principles presented are equally applicable to other communications networks, systems and associated protocols.

Those skilled in the art will appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto. In addition, it is possible to use some of the features of the present subject matter without the corresponding use of the other features. Accordingly, the foregoing description of exemplary or illustrative embodiments is provided for the purpose of illustrating the principles of the present subject matter and not in limitation thereof and may include modification thereto and permutations thereof. The terms "device," "handset," "terminal," and "station" are utilized interchangeably through the present disclosure and such use is not intended to limit the scope of the claims appended herewith. It should also be noted that the terms "node(s)" and "site(s)" and "cell(s)" and "station(s)" are also utilized interchangeably through the present disclosure and such use is not intended to limit the scope of the claims appended herewith. It should also be noted that while measurement information may generally be referred to herein as network measurement report (NMR) information, the claims appended herewith should not be so limited as embodiments of the present subject matter are directed to any type of measurement information whether the information is provided in an NMR or provided in response to an E-CID Request, in response to an OTDOA Request, and the like.

Figure 1:
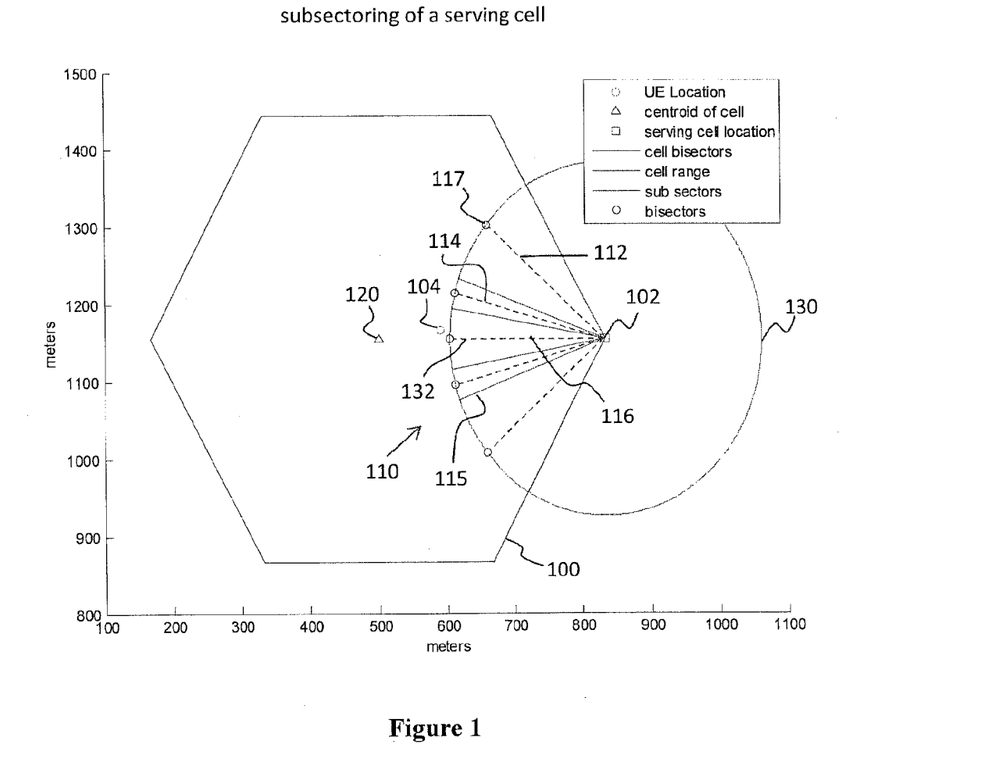
FIG. 1 is an illustration of a sub-sectoring of a serving cell according to some embodiments of the present subject matter.
Figure 2:
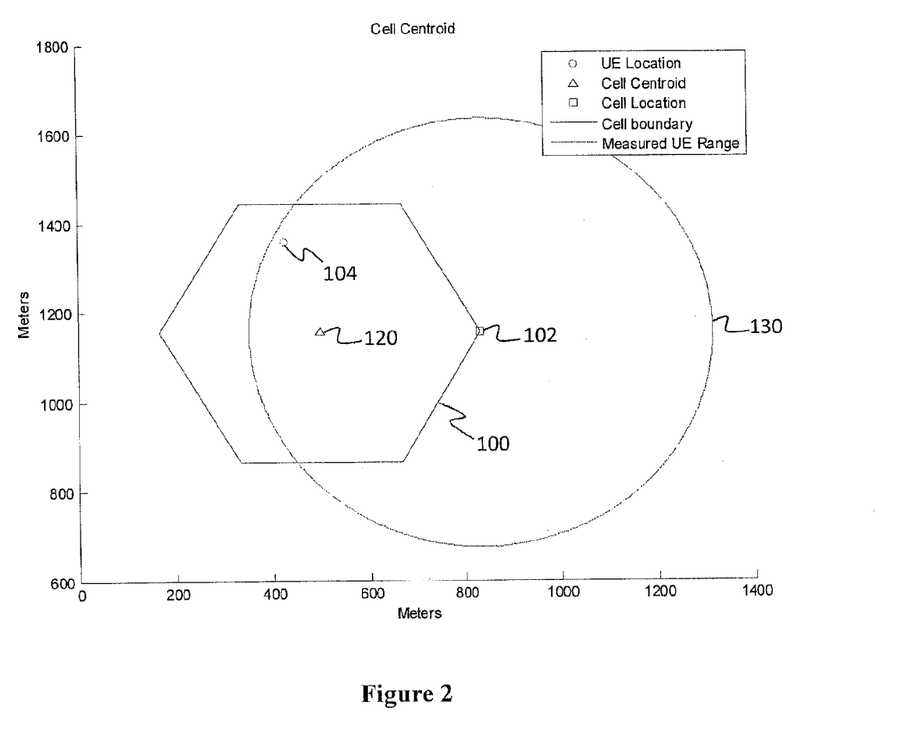
FIG. 2 is an illustration of a cell centroid for an exemplary hexagonal shaped cell according to some embodiments of the present subject matter.
Figure 3:
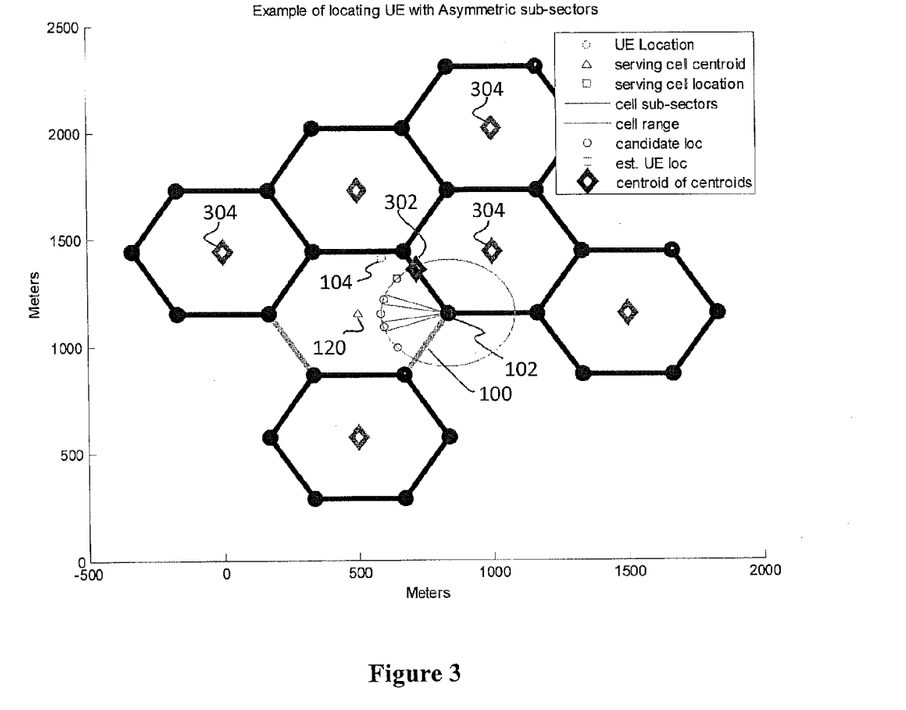
FIG. 3 is an illustration of selected neighbor cells and sub-sectors of a serving cell according to some embodiments of the present subject matter.

FIG. 1 is an illustration of a sub-sectoring of a serving cell according to some embodiments of the present subject matter. FIG. 2 is an illustration of a cell centroid for an exemplary hexagonal shaped cell according to some embodiments of the present subject matter. FIG. 3 is an illustration of selected neighbor cells and sub-sectors of a serving cell according to some embodiments of the present subject matter. With reference to FIGS. 1 through 3, a cell or site defined by a cell boundary 100 is illustrated in a communications network having one or more base stations 102. As depicted, a base station 102 may be serving a target mobile device 104. While the cell boundary 100 is illustrated as an hexagonal geometry, claims appended herewith should not be so limited as embodiments are applicable to any shaped cell. For each cell 100 in the network, an exemplary algorithm may divide the cell 100 into symmetrical and/or asymmetrical subsectors 110. In one embodiment of a cell sub-sectoring step, subsectors angular widths may have the following ratios: (1) exterior subsector 112 angular width=(1/3)*cell opening angle; (2) mid subsector 114 angular width=(1/8)*cell opening angle; and (3) interior subsector 116 angular width=(1/6)*cell opening angle. Such angular widths are, of course, exemplary only and should not limit the scope of the claims appended herewith as exemplary angular widths may be a function of user density, geometry and/or shape of a respective cell, and other variables. Further, the number of sub-sectors depicted in FIG. 1 should not limit the scope of the claims appended herewith as the number of sub-sectors may be even or odd and may be dependent upon user density, cell geometry and/or shape, and other variables. In one embodiment, the sub-sectoring is performed using a priori information available in a database.

An exemplary algorithm may then determine a set of angles for subsector bisectors 115 for each of the subsectors 112, 114, 116 and store the information, indexed by cell ID, in a database. In some embodiments, for each cell 100 in the network a cell centroid 120 may be determined based upon cell opening, range, and antenna(s) heading. The cell centroid coordinates along with the subsector bisectors 115 may then be saved in the database of an exemplary server. FIG. 2 provides an illustration of one embodiment having the cell centroid 120 as the center point of the RF coverage area of a cell 100.

When the location of a target mobile device 104 is desired, a location determination entity, e.g., a mobile location center (MLC), enhanced MLC (eMLC), etc. may use the identity of the serving cell or other information in a request to obtain and store a cached copy of any information associated with that cell from the database. In one embodiment, the location determination entity may send a network measurement request to the target mobile device using, e.g., an E-CID request. The cached information may include, but is not limited to, the centroid of the serving cell, a set of cell bisectors of the serving cell, subsector information, etc.

Upon receiving the network measurements message from the target device, an exemplary location server may filter the neighboring cell power measurements to obtain a better representation of the subset of neighboring cells having the best hearability to the target mobile device. For example, in one embodiment an exemplary filter may employ any one or both of the relationships below:

$$\text{neighborReceivedPowerLevel}_i \geq \text{MinimumPowerThreshold} \quad (1)$$

$$\text{neighborReceivedPowerLevel}_i \geq \text{maxReceivedPowerLevel} - \text{minReceivePowerMargin} \quad (2)$$

where maxReceivedPowerLevel represents the received power of cell site with maximum hearability to the target mobile device and minReceivePowerMargin represents the margin from the maxReceivedPowerLevel. By way of a non-limiting example, if minReceivePowerMargin is set to 20 dB, Equations (1) and (2) would select neighbor power measurements that are within 20 dB of maxReceivedPowerLevel. Of course, any such thresholds may be programmable such that neighboring cell measurements reported in the E-CID message can be used in embodiments of the present subject matter. In additional embodiments of the present subject matter, neighboring cells may be weighted as a function of their respective size. For example, in a non-limiting embodiment, a smaller sized neighboring cell may include a higher weighting to increase the likelihood they are included for centroid computation. In embodiments of the present subject matter having differing cell sizes, identification of cell size may be determined as a function of known transmission power level of the cell, history of reported timing advance (TA) values from UEs within the respective cell (i.e., a TA having a tight variance may indicate a small cell range). In some embodiments, location servers (LS) (e.g., SMLC, SAS, eSMLC) may provide each cell's TA values and may also employ appropriate statistics (e.g., power density function, and the like) of such measurements. By way of further example, if there are discrepancies or differences in the transmit power of the reference signal or another signal measured by a respective handset among neighboring and/or serving cells, the power difference or discrepancy may be compensated when trying to select a subset of strongest hearable eNodeB(s) or BTS(s).

For the selected subset of neighboring cell(s), an exemplary server may then read and obtain the respective cell centroid information from the database. The location server may then determine the centroid 302 of the selected cells' centroids 304 and determine a candidate location for the mobile device having a minimum distance to this centroid. This selected candidate location may be returned by the server as the estimate location. FIG. 3 illustrates such an embodiment.

In another embodiment, candidate locations 117 for the target mobile device 104 may be determined as a function of measured range information received from the server or target device, depicted in the figures as a range ring 130, and an intersection of equatorial bisector lines 132 of each subsector. The number and or location of these candidate locations 117 may be a function of user density, power level of neighboring and/or serving cells (measured by the target device or otherwise), path model information, neighboring cell density, neighboring and serving cell geometry, and the like. Furthermore, the distribution of subsectors, bisector lines and/or candidate points depicted in the figures may be symmetrical (or asymmetrical) above or below an equatorial line 132 and such a depiction is exemplary only. Furthermore, candidate points may be, in one embodiment, more closely spaced at a central location as the orientation of the respective sector may be located at a historical concentration of users. Thus, it follows that any number of points along the range ring 130 may be provided as a candidate location 117. In some embodiments, the number of candidate points 117 may be optimized as a function of location uncertainty factors, e.g., too little candidate points results in a coarse location estimate whereas too many candidate points reduces the effectiveness of any subsequent weighting (e.g., averaging, etc.) of the measurements at such candidate points. In the instance that the serving cell is an Omni cell, then no candidate locations may be cached. Further, if the serving cell is an Omni cell, then an intersection of the measured range ring and a line connecting the centroid of centroids point and the serving cell location may be used as the location estimate.

In other embodiments, an exemplary location server may also return a location uncertainty based upon the type of ranging measurement. For example, a radial uncertainty may have an uncertainty value dependent upon the preciseness of the range measurements, e.g., timing advance (TA), round trip time (RTT), and other range measurements. That is, in 3G and 4G networks, TA Type 1 and Type 2 range estimates may be used whereby the resolution in a TA Type 1 estimate may be better than another range estimate. Such range estimates having higher preciseness may thus have a lower uncertainty value. Further, angular uncertainty may be a function of which subsector is selected and may be a function of beam width, subscriber density, etc. or may be predetermined for the subsector and/or sector.

Figure 4:
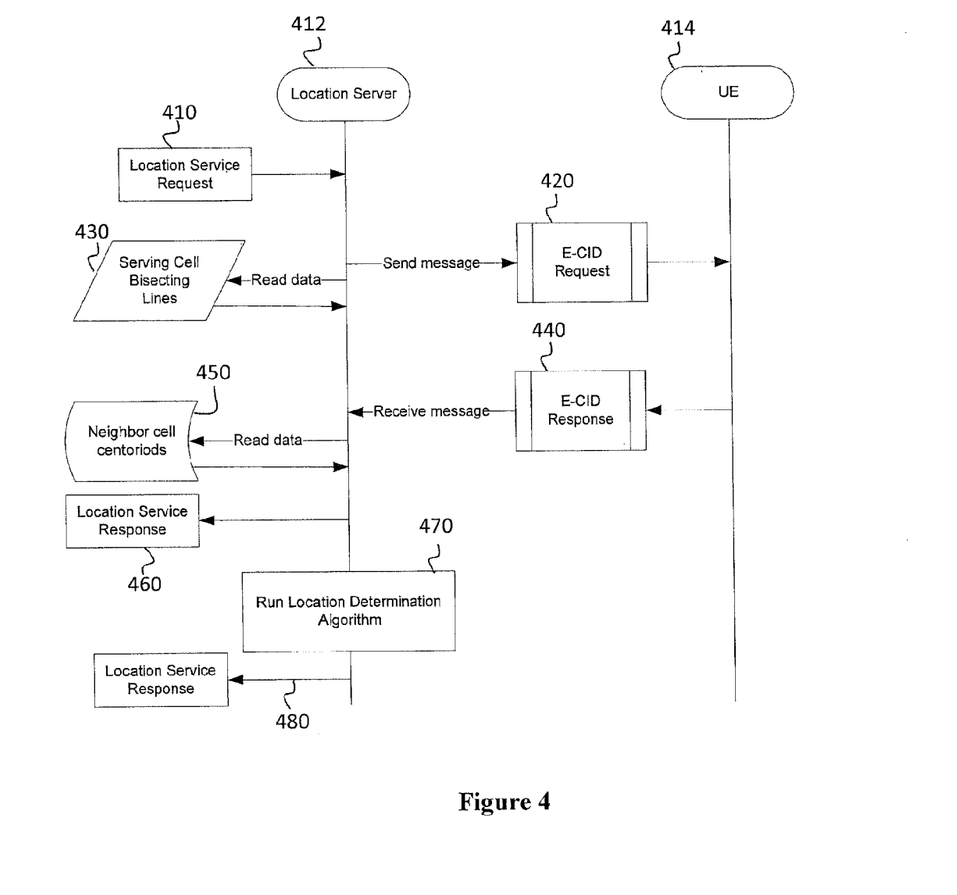
FIG. 4 is a block diagram of a network view for an exemplary location request processing according to some embodiments of the present subject matter.

FIG. 4 is a block diagram of a network view for an exemplary location request processing according to some embodiments of the present subject matter. With reference to FIG. 4, an exemplary method of location determination may include receiving a location service request 410 from a requesting entity at a location server 412 for a target mobile device or UE 414. A network measurement report may be requested of the target device 414 via an E-CID or other request 420, and data may be requested and/or received 430 regarding the cell serving the device. Such data may include sub-sectoring information, cell density, bisector information, and other information described above. In one embodiment, the serving cell may be divided into a group of subsectors and appropriate bisectors and bisector angles determined therefrom. The number, geometry and arrangement of the subsectors, bisectors, etc. may be even or odd and may be symmetrical or asymmetrical. Measurement information may then be received 440 from the target device 414 in an E-CID response message. In one embodiment candidate locations may then be placed on the serving cell's reported range information and subsector bisectors. A subset of the participating cells may then be selected (serving and neighboring) based upon the absolute received signal power level at the target device and/or ratio of the received signal power to the maximum received power. Data may then be requested and/or determined by the location server 412 regarding neighboring cells 450. For example, RF coverage centroids may be determined for each of the selected neighboring cells and a centroid of the RF coverage centroids determined. In one embodiment a candidate location having a minimum distance to the centroid of the RF coverage centroids may be estimated as the location of the target mobile device and the location result returned to the requesting entity in a location service response 460.

In another embodiment, the centroid of cell centroids may be determined using a weighted averaging of selected neighboring cells centroids or an unequally weighted average of selected neighboring cells where the weights are a function of network measurements, such as neighboring and serving cell power level, and/or inter-site distance between neighboring and serving cells. In a further embodiment, the centroid of the cell may be a function of the antenna pattern and transmit power of the broadcast signal from the cell. Of course, cell centroid, bisecting line angles, and other information may be pre-computed and/or cached in the respective server memory. In another embodiment, an exemplary location algorithm 470 may be used to determine the location of the target mobile device 414 as a function of the candidate location having a minimum distance from the centroid of cell centroids. This location determination may then be provided 480 to the requesting entity in a location service response.

Embodiments of the present subject matter are also applicable to networks having repeaters or relays. In such embodiments, the respective LS may employ a function using RSRP/RSRQ and/or TA information to deduce whether a UE is connected directly to the eNodeB or connected via a relay or repeater. In a non-limiting embodiment of the present subject matter, an appropriate function may employ a logic function as identified in Table I below. Using such information, a location server may then provide a logical determination or identification of the presence of a repeater using observations of statistically significant measurements reported from the UE(s).

TABLE 1

| TA | RSRP/RSRQ | Function output |
| --- | --- | --- |
| Large | High | Repeater connection likely |
| Small | High | Direct eNodeB connection likely |

TABLE 1-continued

| TA | RSRP/RSRQ | Function output |
|---|---|---|
| Large | Low | Connection at edge of eNodeB likely |
| Small | Low | Direct eNodeB connection likely with possible shadowing |

With reference to Table 1 provided above, it follows that if it is determined that received TA values exceed an expected cell range, this may indicate that the UE is connected via a repeater. In embodiments of the present subject matter having cells with known relays/repeater within a coverage area, a set of neighboring cells may be identified that are likely to be detected near the relay site versus near the eNodeB. This may assist in the determination of whether the UE is using a repeater or otherwise. In embodiments of the present subject matter where a relay or repeater is out-band, at the location server, absolute radio frequency channel number (ARFCN) information may be determined (e.g., from the NMR) to identify the repeater or relay. Further, if the serving and neighboring cells share the same Cell-ID but different ARFCNs then it may be determined known that the UE is hearing both. In embodiments where the ARFCN of reported Cell-IDs is different from the value stored in the site information, then it may be determined that the UE is connected to the serving cell through a repeater. In embodiments of the present subject matter where a relay or repeater is in-band, the repeater or relay may be determined using a TA-RSRP pair to resolve ambiguity between the serving cell and relay, e.g., using an inverse function of that provided in Table I above, or the like.

If it is determined or identified that a UE is served by an amplify and forward type relay (same PCI) using, for example, the logic determinations of Table 1 or otherwise, a TA range may be corrected to compensate for any delay incurred in the repeater equipment. If it is determined that the UE is served by an in-band relay (e.g., same PCI), then the TA may be corrected by adding the distance from the donor eNodeB antenna to the repeater antenna. The corrected TA value may then be employed to estimate the range of the mobile device from the serving eNodeB rather than the repeater. In such embodiments, the determination of the centroid of cell centroids may include the repeater antenna position. Further, any weighting of the repeater antenna position may be adjusted depending on the received measurement.

Exemplary location servers according to embodiments of the present subject matter may interface with Self Organizing Network (SON) server functions to update characteristics of cells within the respective network. For example, an exemplary location server may ping a SON server for changes in transmission power, changes in antenna tilt, changes in antenna azimuth, changes in antenna beam width, to name a few. Once the location server receives these updated parameters from an SON server, the centroid of the modified cells may be recalculated or updated as necessary. Such pinging of the SON server may be synchronous or asynchronous. In some embodiments, asynchronous pinging may be initiated by the location server when the appearance or disappearance of neighboring cells at certain TA values that have been recorded and/or when the SON server makes changes affecting certain parameters (transmission power, antenna tilt, antenna azimuth, antenna beam width, to name a few), the location server may be tipped by the SON server to initiate an update. In another embodiment, the location server may use the history of E-CID measurements, such as neighbor lists, to infer that the SON has changed the configuration of some cells. Using such a history, the location server would therefore ping the SON server/functions for an update of changed values to reduce the amount of traffic in the network between the SON and positioning determining entity. In a further embodiment, the location server may forward UE location estimates to the SON along with associated E-CID measurements to ensure the SON adjusts cell parameters more accurately. In embodiments of the present subject matter where a serving cell is known to be part of a DAS system, then it may be deduced that the UE is in a "small" cell and the location should be within a building of known latitudes and longitudes whereby the serving-neighbor label may then be associated with a small cell in the location server.

Figure 5:
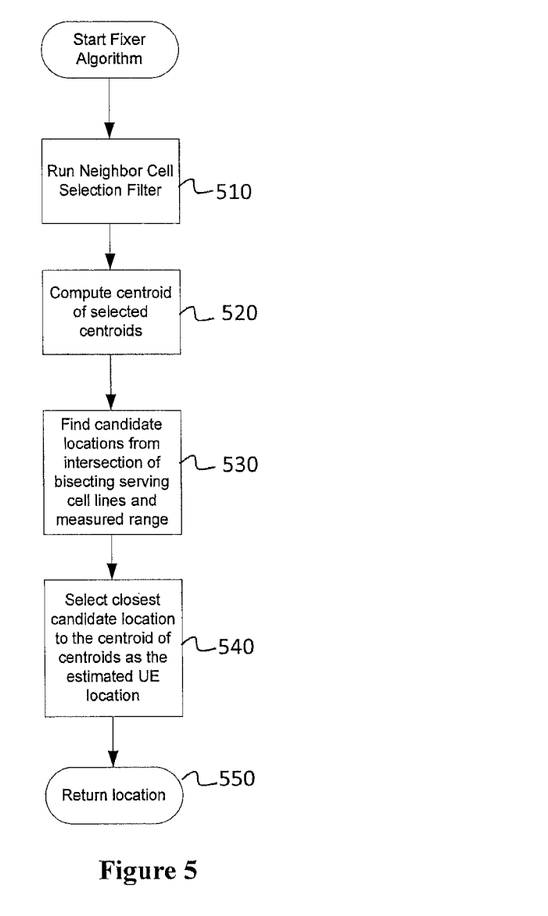
FIG. 5 is a block diagram for an exemplary location determination algorithm according to some embodiments of the present subject matter.

FIG. 5 is a block diagram for an exemplary location determination algorithm 470 according to some embodiments of the present subject matter. With reference to FIG. 5, one embodiment of the present subject matter provides an exemplary location determination algorithm which filters measurement information from neighboring cells at step 510 as described above. A centroid of selected cell centroids (e.g., neighboring and/or serving) may then be determined at step 520, and candidate locations determined from an intersection of bisecting serving cell lines and measured range information (e.g., timing advance, round trip time, OTDOA, TDOA, etc.) at step 530. At step 540 the closest candidate location to the centroid of the selected centroids may be selected as the estimated location of the target mobile device and the location returned to the requesting entity at step 550.

Figure 6:
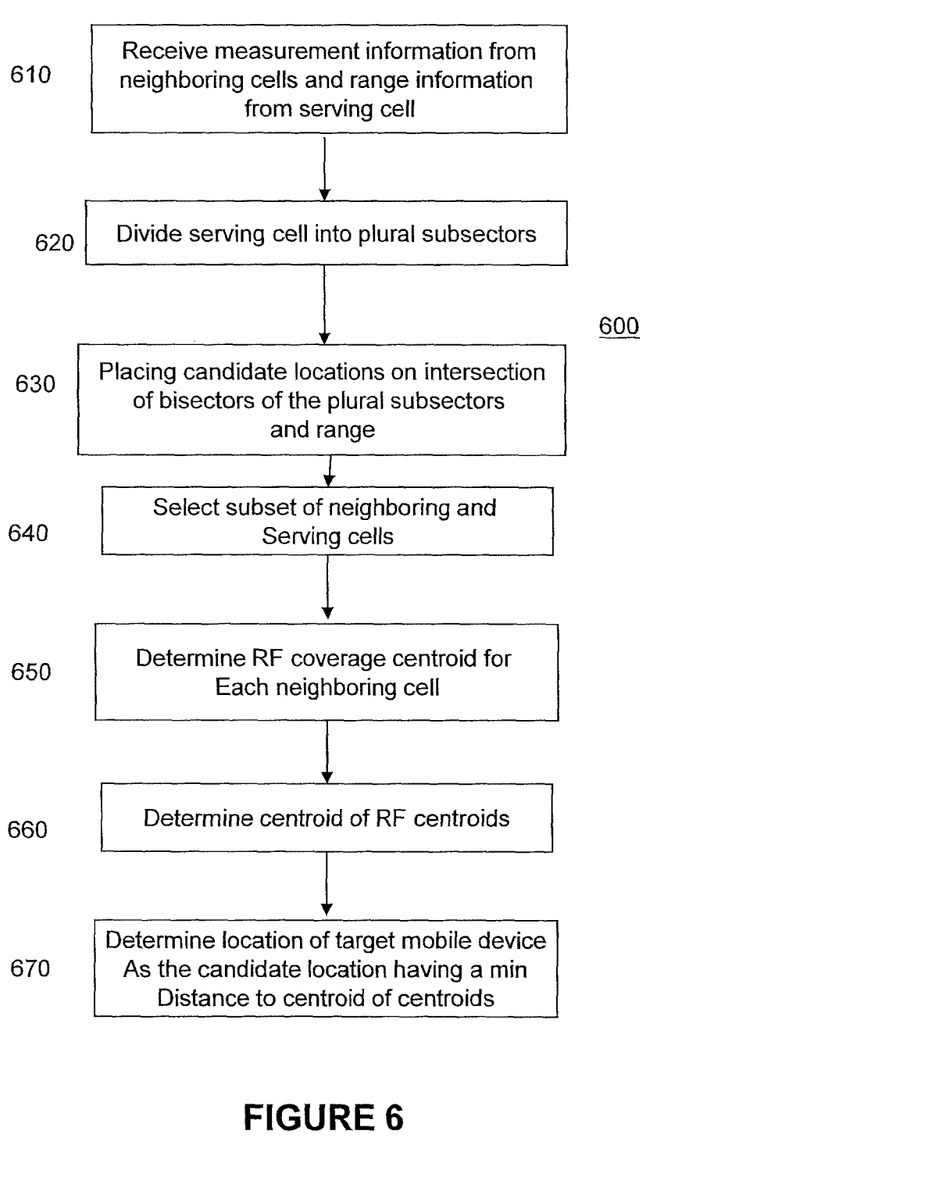
FIG. 6 is a block diagram for another exemplary location determination algorithm according to some embodiments of the present subject matter.

FIG. 6 is a block diagram for another exemplary location determination algorithm according to some embodiments of the present subject matter. With reference to FIG. 6, a method 600 of determining the location of a mobile device is provided. At step 610, a network measurement report (NMR) from a target mobile device may be received, the NMR having NMR measurement information for a cell serving the target mobile device. Exemplary NMR measurement information may be, but is not limited to, an absolute received signal power level observed at the target mobile device, a ratio of received signal power to maximum received power, and combinations thereof. At step 620, the serving cell may be divided into a plurality of subsectors, and at step 630, candidate locations may be placed on an intersection of bisectors of the plurality of subsectors and a range determined using the NMR range information. In some embodiments, the bisectors are determined as a function of cell geometry, user density, inter-cell distance, power level, and combinations thereof. These subsectors may be, in some embodiments, asymmetrically distributed in the serving cell about an equatorial line of a respective sector and may be determined as a function of cell geometry, user density, inter-cell distance, power level, and combinations thereof. In other embodiments, the subsectors may be distributed in the serving cell as a function of beam width. In a further embodiment, the determined range may be a function of timing advance or round trip time.

At step 640, a subset of neighboring and serving cells may be selected as a function of the NMR measurement information. At step 650, an RF coverage centroid for each of the selected neighboring cells may be determined. In some embodiments, a determined RF centroid may be a midpoint of the RF coverage area of the serving cell and in other embodiments, a determined RF centroid may be a function of antenna pattern, transmit power of the broadcast signal from a neighboring or serving cell, and combinations thereof. In additional embodiments, the determined RF cell centroid and bisectors may be predetermined. In further embodiments, the location of the RF coverage centroid may be a function of an RF configuration parameter, transmit power, antenna pattern, antenna down tilt, antenna gain, and combinations thereof.

At step 660, a centroid of the determined RF centroids may be determined and a location of the target mobile device as determined the candidate location having a minimum distance to the determined centroid at step 670. In some embodiments, step 660 may include performing an equally or unequally weighted average of selected neighboring cell centroids. These weights may be a function of values selected from the group consisting of neighboring cell power level, serving cell power level, inter-site distance between neighboring and serving cells, and combinations thereof. In other embodiments, step 660 may include determining whether a repeater is present in the serving or neighboring cells and, if the presence of a repeater is determined, then using a location of the repeater as one of the plural determined RF centroids, and weighting the location of the repeater as a function of information received from the repeater. In another embodiment, the method includes the step of determining radial or angular uncertainties of the mobile device location. This radial uncertainty may be determined as a function of type of range information in the NMR measurement information, and the angular uncertainty may be determined as a function of the selected subsector. In embodiments where the serving cell is an Omni cell, the determined location of the target device may be an intersection of the reported range information and a line connecting the determined centroid of RF coverage centroids and serving cell location. In a further embodiment, the method may include re-determining the centroid of the determined RF centroids as a function of information from a self-organizing network selected from the group consisting of transmission power, antenna tilt, antenna azimuth, antenna beam width, and combinations thereof.

Figure 7:
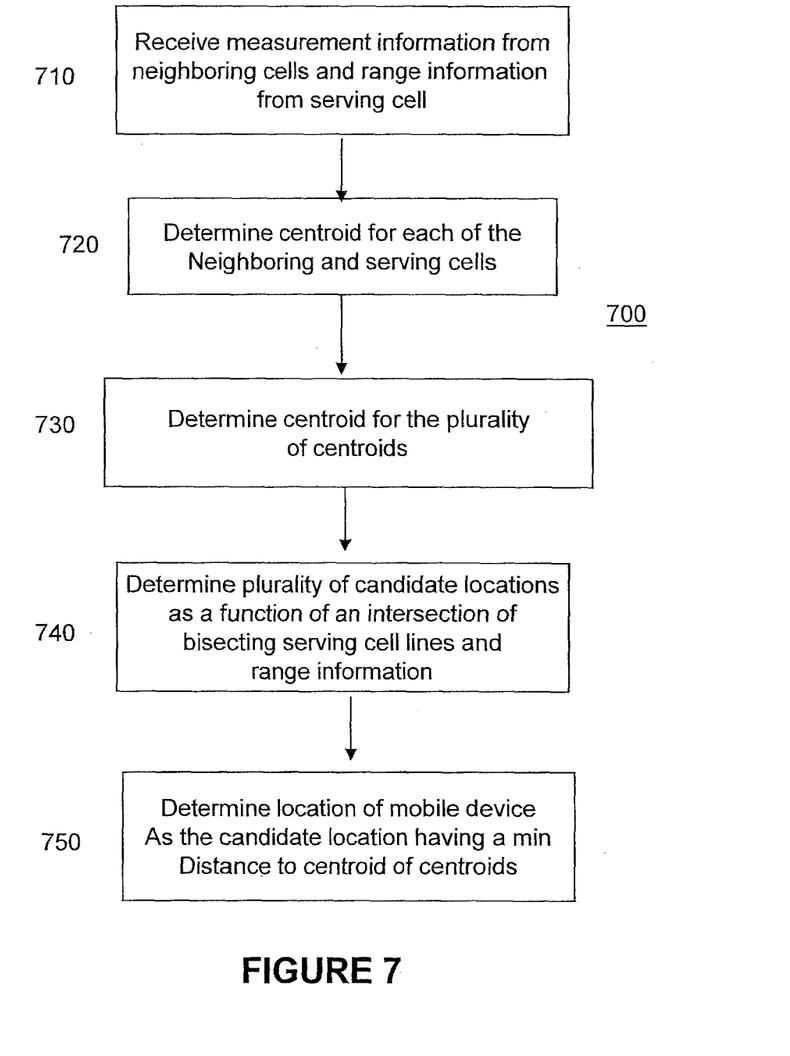
FIG. 7 is a block diagram for a further exemplary location determination algorithm according to some embodiments of the present subject matter.

FIG. 7 is a block diagram for a further exemplary location determination algorithm according to some embodiments of the present subject matter. With reference to FIG. 7, a method 700 of determining the location of a mobile device in a communications network in communication with a serving cell is provided. At step 710, measurement information from cells neighboring the serving cell and range information from the serving cell may be received and, at step 720, a centroid for each of a plurality of neighboring and serving cells determined. Exemplary measurement information may be from a network measurement report. At step 730 a centroid for the plurality of centroids of neighboring and serving cells may be determined, and at step 740 a plurality of candidate locations may be determined as a function of an intersection of bisecting serving cell lines and the received range information. In some embodiments, step 730 may include performing a weighted average of selected neighboring cell centroids. At step 750, a location of the mobile device as the candidate location having a minimum distance to the determined centroid of the plurality of centroids may then be determined. The method may include in other embodiments, the steps of determining radial and/or angular uncertainties of the mobile device location. In an additional embodiment, the method may include re-determining the centroid of the determined centroids as a function of information from a self-organizing network selected from the group consisting of transmission power, antenna tilt, antenna azimuth, antenna beam width, and combinations thereof. In a further embodiment, step 730 may include determining whether a repeater is present in the serving or neighboring cells, and if the presence of a repeater is determined, then using a location of the repeater as one of the plural determined centroids, and weighting the location of the repeater as a function of information received from the repeater.

The present disclosure may also be implemented by a general purpose computer programmed in accordance with the principals discussed herein. It may be emphasized that the above-described embodiments, particularly any "preferred" or exemplary embodiments, are merely possible examples of implementations, merely set forth for a clear understanding of the principles of the present subject matter. Many variations and modifications may be made to the above-described embodiments of the present subject matter without departing substantially from the spirit and principles of the present subject matter. All such modifications and variations are intended to be included herein within the scope of this present subject matter.

The functionality of exemplary location server as described herein may be implemented fully or partially on the UE in the form of an application. In such embodiments, an exemplary application may include features including, but not limited to, a database for cell location, centroid and orientation residing in the mobile device memory. In such embodiments, when the mobile device changes geographic regions, the database may be updated and/or may be loaded with an entirely new set of information specific for the geographic region. In other embodiments, the mobile device may access a database hosted on a server (e.g., location server or otherwise) containing cell location, centroid and orientation information over an IP connection.

Embodiments of the subject matter and the functional operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer program products, i.e., one or more modules of computer program instructions encoded on a tangible program carrier for execution by, or to control the operation of, data processing apparatus. The tangible program carrier may be a computer readable medium. The computer readable medium may be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described herein may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, input from the user may be received in any form, including acoustic, speech, or tactile input.

Embodiments of the subject matter described herein may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described herein, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this description may contain many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

As shown by the various configurations and embodiments illustrated in FIGS. 1-7, various embodiments for methods and systems of E-CID location using uniform subsectors and neighboring cell centroids have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method of determining the location of a mobile device comprising the steps of:
  (a) receiving measurement information from cells neighboring the serving cell and range information from the serving cell;
  (b) dividing the serving cell into a plurality of subsectors;
  (c) placing candidate locations on an intersection of bisectors of the plurality of subsectors and a range determined using the range information;
  (d) selecting a subset of neighboring and serving cells as a function of the measurement information;
  (e) determining a radio frequency (RF) coverage centroid for each of the selected neighboring cells;
  (f) determining a centroid of the determined RF centroids based on a weighted average of selected neighboring cell centroids, wherein each of the weights of the weighted average vary as a function of at least one of a neighboring cell power level, a serving cell power level and an inter-site distance between neighboring cells and serving cells;
  (g) determining a location of the target mobile device as the candidate location having a minimum distance to the determined centroid.

2. The method of claim 1 wherein the measurement information is selected from the group consisting of an absolute received signal power level observed at the target mobile device, a ratio of received signal power to maximum received power, and combinations thereof.

3. The method of claim 1 wherein the step of selecting a subset of neighboring and serving cells further comprises weighting measurement information for one or more of the neighboring and serving cells as a function of cell size.

4. The method of claim 1 further comprising the step of determining radial or angular uncertainties of the mobile device location.

5. The method of claim 1 wherein one determined RF centroid is a midpoint of the RF coverage area of the serving cell.

6. The method of claim 1 wherein one determined RF centroid is a function of values selected from the group consisting of antenna pattern, transmit power of the broadcast signal from a neighboring or serving cell, and combinations thereof.

7. The method of claim 1, wherein the RF coverage centroid for each of the selected neighboring cells is spaced apart from base stations that serve the neighboring cells.

8. A method of determining the location of a mobile device comprising the steps of:
   (a) receiving measurement information from cells neighboring the serving cell and range information from the serving cell;
   (b) dividing the serving cell into a plurality of subsectors;
   (c) placing candidate locations on an intersection of bisectors of the plurality of subsectors and a range determined using the range information;
   (d) selecting a subset of neighboring and serving cells as a function of the measurement information;
   (e) determining a radio frequency (RF) coverage centroid for each of the selected neighboring cells;
   (f) determining a centroid of the determined RF centroids;
   (g) determining a location of the target mobile device as the candidate location having a minimum distance to the determined centroid;
   wherein the step of selecting a subset of neighboring and serving cells further comprises weighting measurement information for one or more of the neighboring and serving cells as a function of cell size;
   wherein cell size is determined as a function of transmission power level of the respective cell, timing advance values from mobile devices within the respective cell, and combinations thereof.

9. A method of determining the location of a mobile device comprising the steps of:
   (a) receiving measurement information from cells neighboring the serving cell and range information from the serving cell;
   (b) dividing the serving cell into a plurality of subsectors;
   (c) placing candidate locations on an intersection of bisectors of the plurality of subsectors and a range determined using the range information;
   (d) selecting a subset of neighboring and serving cells as a function of the measurement information;
   (e) determining a radio frequency (RF) coverage centroid for each of the selected neighboring cells;
   (f) determining a centroid of the determined RF centroids;
   (g) determining a location of the target mobile device as the candidate location having a minimum distance to the determined centroid;
   (h) determining a radial uncertainty of the mobile device location, wherein the radial uncertainty is determined as a function of type of range information.

10. A method of determining the location of a mobile device comprising the steps of:
    (a) receiving measurement information from cells neighboring the serving cell and range information from the serving cell;
    (b) dividing the serving cell into a plurality of subsectors;
    (c) placing candidate locations on an intersection of bisectors of the plurality of subsectors and a range determined using the range information;
    (d) selecting a subset of neighboring and serving cells as a function of the measurement information;
    (e) determining a radio frequency (RF) coverage centroid for each of the selected neighboring cells;
    (f) determining a centroid of the determined RF centroids;
    (g) determining a location of the target mobile device as the candidate location having a minimum distance to the determined centroid;
    (h) determining an angular uncertainty of the mobile device location, wherein the angular uncertainty is determined as a function of the selected subsector.

11. A method of determining the location of a mobile device comprising the steps of:
    (a) receiving measurement information from cells neighboring the serving cell and range information from the serving cell;
    (b) dividing the serving cell into a plurality of subsectors;
    (c) placing candidate locations on an intersection of bisectors of the plurality of subsectors and a range determined using the range information;
    (d) selecting a subset of neighboring and serving cells as a function of the measurement information;
    (e) determining a radio frequency (RF) coverage centroid for each of the selected neighboring cells;
    (f) determining a centroid of the determined RF centroids;
    (g) determining a location of the target mobile device as the candidate location having a minimum distance to the determined centroid;
    wherein the step of determining a centroid of the determined RF centroids further comprises performing an unequally weighted average of selected neighboring cell centroids;
    wherein the weights are a function of values selected from the group consisting of neighboring cell power level, serving cell power level, inter-site distance between neighboring and serving cells, and combinations thereof.

* * * * *

UNITED STATES PATENT AND TRADEMARK OFFICE
CERTIFICATE OF CORRECTION

PATENT NO. : 9,176,216 B2  
APPLICATION NO. : 13/834057  
DATED : November 3, 2015  
INVENTOR(S) : Khalid Al-Mufti et al.

It is certified that error appears in the above-identified patent and that said Letters Patent is hereby corrected as shown below:

On the Title Page, Item (54) and in the Specification, Column 1 "ENHANCED CELL ID LOCATION METHOD USING NON UNIFORM SUBSECTORS AND NEIGHBORING CELL CENTROID" should read --ENHANCED CELL ID LOCATION METHOD USING NON-UNIFORM SUBSECTORS AND NEIGHBORING CELL CENTROID--

Signed and Sealed this  
Sixteenth Day of February, 2016

Michelle K. Lee  
*Director of the United States Patent and Trademark Office*